United States Patent
Tonchia

(10) Patent No.: US 9,784,872 B2
(45) Date of Patent: *Oct. 10, 2017

(54) METHOD AND DEVICE FOR CONTROLLING SOURCE ARRAY GEOMETRY

(71) Applicant: CGG SERVICES SAS, Massy (FR)

(72) Inventor: Helene Tonchia, Antony (FR)

(73) Assignee: CGG SERVICES SAS, Massy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,523

(22) Filed: Dec. 14, 2016

(65) Prior Publication Data

US 2017/0090056 A1 Mar. 30, 2017

Related U.S. Application Data

(63) Continuation of application No. 14/159,623, filed on Jan. 21, 2014, now Pat. No. 9,581,713.

(60) Provisional application No. 61/755,678, filed on Jan. 23, 2013.

(51) Int. Cl.
*G01V 1/38* (2006.01)

(52) U.S. Cl.
CPC .......... *G01V 1/3808* (2013.01); *G01V 1/3817* (2013.01); *G01V 2210/1293* (2013.01)

(58) Field of Classification Search
CPC ... G01V 1/3808; G01V 1/3817; G01V 1/3826
See application file for complete search history.

(56) References Cited

U.S. PATENT DOCUMENTS

| | | |
|---|---|---|
| 4,724,788 A | 2/1988 | Ayers |
| 7,457,193 B2 | 11/2008 | Pramik |
| 7,804,738 B2 | 9/2010 | Storteig et al. |
| 7,957,220 B2 | 6/2011 | Howlid et al. |
| 8,462,581 B2 | 6/2013 | Langeland |
| 2007/0019504 A1 | 1/2007 | Howlid et al. |
| 2007/0247971 A1 | 10/2007 | Semb et al. |
| 2011/0176384 A1 | 7/2011 | Soubaras |
| 2012/0069704 A1 | 3/2012 | Cambois |
| 2013/0070557 A1 | 3/2013 | Tonchia et al. |
| 2013/0070559 A1 | 3/2013 | Barker |
| 2013/0100764 A1 | 4/2013 | Ruet |
| 2013/0139742 A1 | 6/2013 | Macquin et al. |
| 2013/0155805 A1 | 6/2013 | Tonchia |
| 2014/0112096 A1 | 4/2014 | Dowle et al. |

OTHER PUBLICATIONS

Office Action received in corresponding Australian Application No. 2014200391. All references not cited herewith have been previously made of record.

*Primary Examiner* — Hovhannes Baghdasaryan
(74) *Attorney, Agent, or Firm* — Patent Portfolio Builders PLLC

(57) ABSTRACT

Methods related to controlling a source array while performing a seismic survey to achieve an intended source signature. A current three dimensional arrangement of the individual seismic sources is compared with a target 3D arrangement. In view of the comparison, position of at least one of the individual seismic sources is adjusted so that the adjusted 3D arrangement of the individual seismic sources to substantially match the target 3D arrangement.

10 Claims, 16 Drawing Sheets

Figure 10
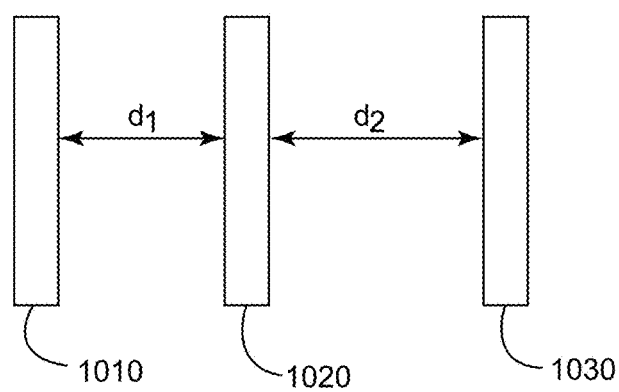
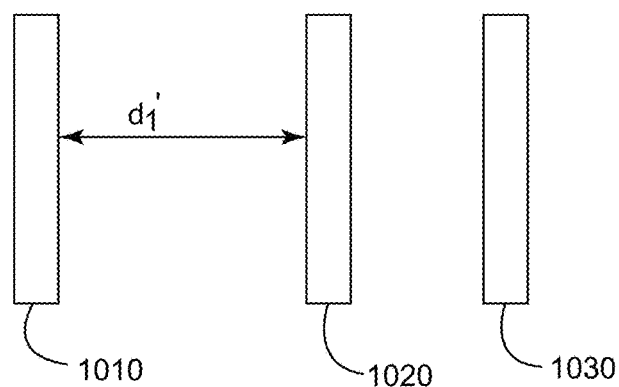
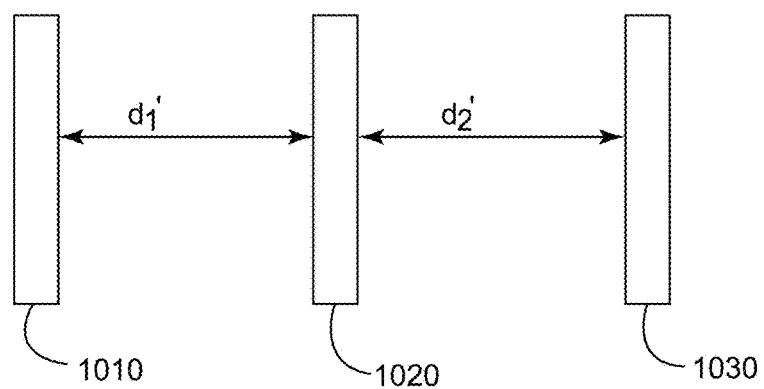

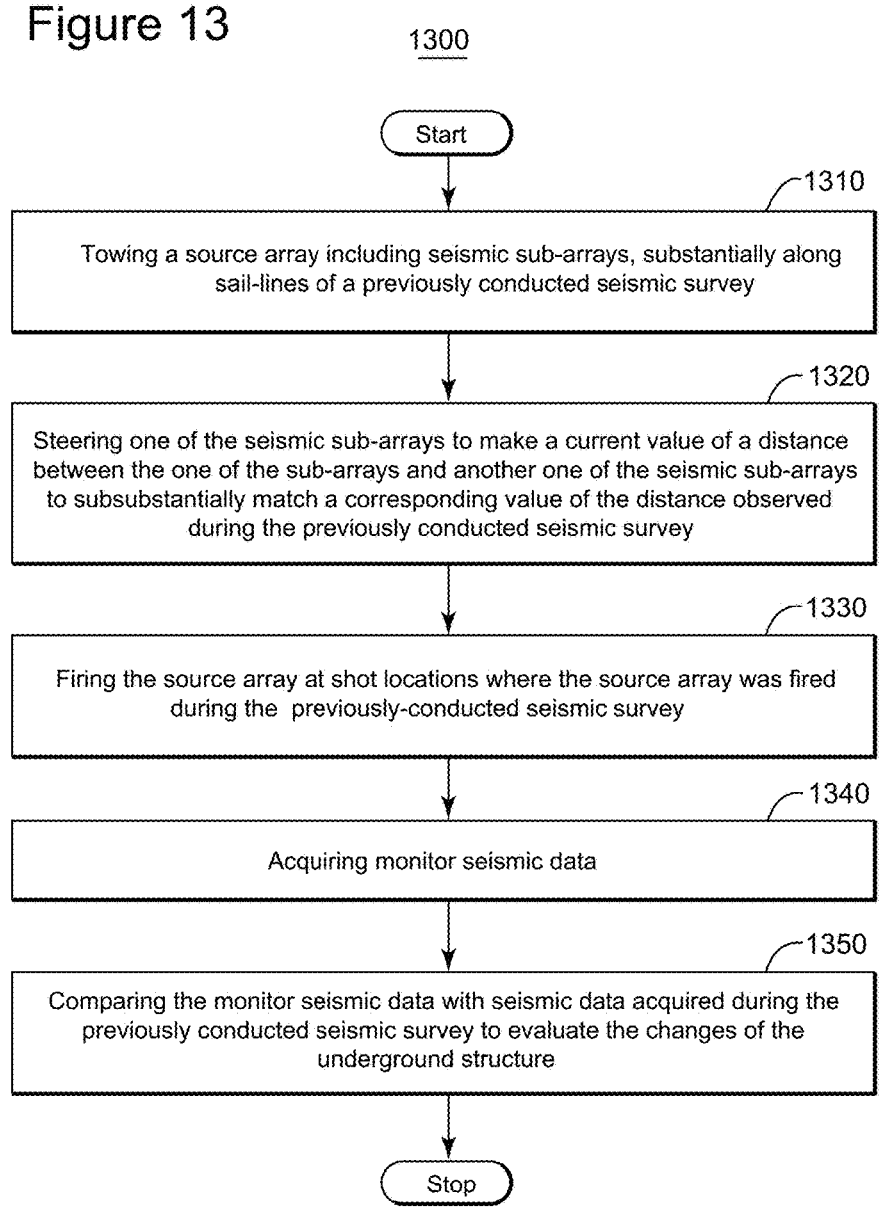

METHOD AND DEVICE FOR CONTROLLING SOURCE ARRAY GEOMETRY

CROSS REFERENCE TO RELATED APPLICATIONS

This application is a continuation of U.S. patent application Ser. No. 14/159,623, filed Jan. 21, 2014, which claims priority and benefit from U.S. Provisional Patent Application No. 61/755,678 filed Jan. 23, 2013, for "Dynamic Source Geometry for 4D-Sub Array Separation," the entire contents of which are incorporated herein by reference.

BACKGROUND

Technical Field

Embodiments of the subject matter disclosed herein generally relate to methods and devices used for monitoring a seismic array's geometry and adjusting trajectory of components thereof to achieve a target geometry and thereby an intended source signature.

Discussion of the Background

Seismic surveys are used to investigate underground formations by generating seismic waves and measuring reflected waves (i.e., their travel time, amplitude, direction, etc.). Seismic data is processed and converted into structural information about the underground formation.

Time-lapse seismic surveying is increasingly used to evaluate hydrocarbon-bearing underground reservoirs' evolution. In time-lapse seismic surveying, seismic data related to the same underground target volume is acquired at least twice over a given time (e.g., months or even years). The time-lapse seismic survey data is considered to be four dimensional (4D) because time between seismic surveys (or survey index) is an additional dimension to the typical three-dimensional seismic data acquired during each survey. The earliest of the seismic surveys is known as the "base survey" (during which base data is acquired), and subsequent seismic surveys are known as monitor surveys (during which monitor data sets are acquired).

Differences observed in seismic data acquired during successive seismic surveys may be due to changes inside the surveyed target volume and/or data acquisition variations. Since changes inside the surveyed target volume are of interest, efforts to minimize data acquisition variations are ongoing. Various techniques have been developed to reproduce source and receiver locations of the base (or earlier) seismic survey during monitor (later) survey(s). For example, U.S. Patent Application Publication No. 2007/0247971 (the entire content of which is incorporated herein by reference) describes a method for monitoring and steering a source array during a monitor survey to follow the path of the source array during a previous (e.g., "base") seismic survey. However, firing the source array at the same shot locations is not enough because the source array signatures may be quite different, as explained below.

FIG. 1 illustrates a marine seismic data acquisition system including a vessel 10 towing a source array 20 and streamers 30 (not all are labeled) along a sail-line S. Source array 20 includes plural sub-arrays 21-26, which are described in more detail below. Streamers 30 are connected to vessel 10 via lead-in cables 32A and 32B, which are pulled laterally by deflectors 34A and 34B.

A single sub-array 200 (that may have a 25-50 m length and include 6-8 individual seismic sources) is illustrated in FIG. 2. Sub-array 200 includes a float 210 and individual seismic sources 220a-g (that may have different characteristics). Plural floats may be used, for example, in seismic data acquisition in shallow water. Each of the individual seismic sources is attached to one of source base-plates 225a-g via pairs of cables 222a-g (only 222a and 222g labeled), and source base plates 225a-g are suspended under float 210 via cables 227a-g. Plural individual seismic sources (i.e., a cluster of individual seismic sources) may be attached to any one of the base-plates. The source base plates are connected to each other via links 230a-g (only 230a, 230b and 222g labeled) and to the towing vessel via an umbilical 240 to receive and distribute electric power and compressed air to the individual seismic sources. The individual sources may be attached to a single stiff base instead of being attached plural base plates. Note that the seismic source may also have no float as described, for example, in U.S. Pat. No. 7,457,193 (the entire content of which is incorporated herein by reference).

The individual seismic sources are fired such that, at a great enough distance from the source array, primaries (i.e., first oscillation) from each individual source interfere constructively, while secondaries (i.e., subsequent oscillation) interfere destructively, with pressure variations caused by the individual sources merging in a seismic wave. Beyond a certain distance (e.g., more than 100 m, which is far greater than the source's dimensions), this seismic wave has a stable frequency-versus-amplitude shape, its amplitude then decreasing inversely proportional to the distance from the source (as is the case for a point-like source). The frequency-versus-amplitude shape that no longer changes significantly with distance is known as the source signature. The source signature is a basic characteristic of seismic data acquisition because the seismic waves detected in response to this wave are a convolution of the source signature with the target volume response. The source signature also varies with the azimuth angle (i.e., the angle from a tow axis to a line between the shot location and a receiver location).

The source signature depends on characteristics of the individual seismic sources (e.g., air gun or air gun cluster type, volume, pressure etc.), their geometrical arrangement (e.g., inline distances between the individual seismic sources in a sub-array, distance between the sub-arrays, depths of the individual seismic sources, etc.), the firing sequence of the individual seismic sources and environment conditions (e.g., waves, currents, etc.). Some of these parameters, such as the characteristics of individual seismic sources or the firing sequence, can be reliably reproduced in successive surveys, thus ensuring that these parameters do not alter the source signature from one survey to another survey. However, some other parameters, such as environment conditions, cannot be controlled, but the effect of these parameters on the source signature may be alleviated during data acquisition or taken into account during seismic data processing. For example, the depth of the source array may be adjusted depending on wave height (i.e., an environmental condition that cannot be controlled) to achieve the same source signature.

One parameter affecting the source signature that conventionally has not been a concern is the source array's geometry. However, in fact, this geometrical arrangement may vary from shot to shot and has a significant impact on the source signature. FIGS. 3A-3C schematically illustrate source array's geometry changes that may occur during seismic data acquisition and alter the source array's signature. In FIG. 3A (which is a bird-eye view), a distance $d_1$ between sub-arrays 310 and 320 at a first location, O, along sail-line 330 is smaller than a distance $d_2$ between sub-arrays 310 and 320 at a second location, O'. In FIG. 3B (which is also a bird-eye view), at a first location, O, sub-array 310 is substantially parallel to sail-line 330, and then, at a second location, O', sub-array 310 makes a non-zero angle β with sail-line 330. In FIG. 3C (which is a vertical plane view as suggested by the direction of gravitational acceleration g), sub-arrays 310 and 320 are at a same depth $h_1$, at a first location, O, but then, sub-array 310 is at a depth $h_1 > h_2$, at a second location, O'. In yet another example, the sub-arrays inline position (i.e., position along sail-line) is a parameter that affects the source signature.

In order to produce an intended source signature (e.g., reproduce the source signature during a previous survey when acquiring 4D seismic data) is would be desirable to control the source array's geometry while acquiring seismic data.

SUMMARY

Controlling a source array's geometry to match an intended arrangement while performing a seismic survey enables to achieve a desired source signature. The intended arrangement may be a target ideal arrangement or may be the source's arrangement during a previous survey of the same underground structure (i.e., 4D data).

According to an embodiment, there is a method for reproducing geometry of a source array used during a previously-conducted seismic survey. The method includes towing the source array substantially along a sail-line followed during the previously-conducted seismic survey. The method also includes comparing a current value of one or more parameters related to the geometry of the source array with a corresponding previous value of the one or more parameters during the previously-conducted seismic survey, the current value and the previous value corresponding to a first location along the sail-line. The method further includes adjusting a position of at least one component of the source array to make the current value to substantially match the corresponding previous value.

According to another embodiment, there is a method for evaluating changes of an underground structure explored using seismic surveys. The method includes towing a source array including seismic sub-arrays, substantially along sail-lines of a previously-conducted seismic survey, and steering one of the seismic sub-arrays to make a current value of a distance between the one of the sub-arrays and another one of the seismic sub-arrays to substantially match a corresponding value of the distance observed during the previously-conducted seismic survey. The method further includes firing the source array at shot locations where the source array was fired during the previously-conducted seismic survey, acquiring monitor seismic data, and comparing the monitor seismic data with seismic data acquired during the previously-conducted seismic survey to evaluate the changes of the underground structure.

According to yet another embodiment, there is a seismic survey method including towing a source array including plural individual seismic sources substantially along a pre-determined path, comparing a current three dimensional (3D) arrangement of the plural individual seismic sources with a target 3D arrangement and adjusting a position of at least one of the plural individual seismic sources so that an adjusted 3D arrangement of the plural individual seismic sources to substantially match the target 3D arrangement.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 10 is an example of adjusting plural sub-arrays of a source array according to an embodiment;

FIG. 13 is a flowchart of a method for evaluating changes of an underground structure explored using seismic surveys, according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are related to acquiring marine seismic data while controlling the source array's geometry to achieve desired seismic signatures. The desired seismic signatures may be the seismic signatures during a previous survey of the same target volume.

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

According to various embodiments described in this document, the 3D arrangement (geometry) of plural individual seismic sources in a source array is controlled so that parameters related to this 3D arrangement match target parameters. Upon matching the target parameters, a desired source signature is produced (or reproduced) when actuating ("firing") the source array. The source signature is determined (among other factors) by the 3D arrangement of the individual sources so that, different 3D arrangements produce different source signatures (all other things being the same).

Figure 1:
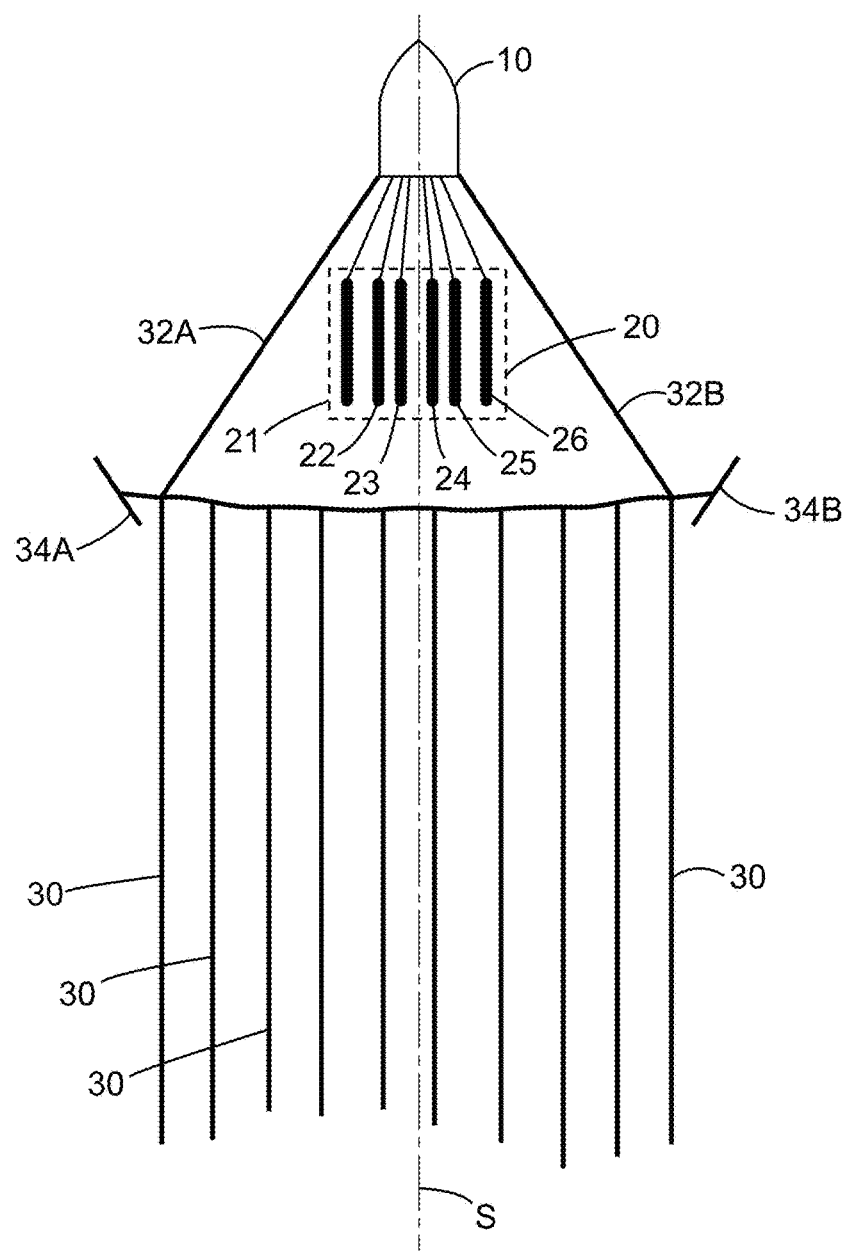
FIG. 1 illustrates a typical marine seismic data acquisition system.
Figure 2:
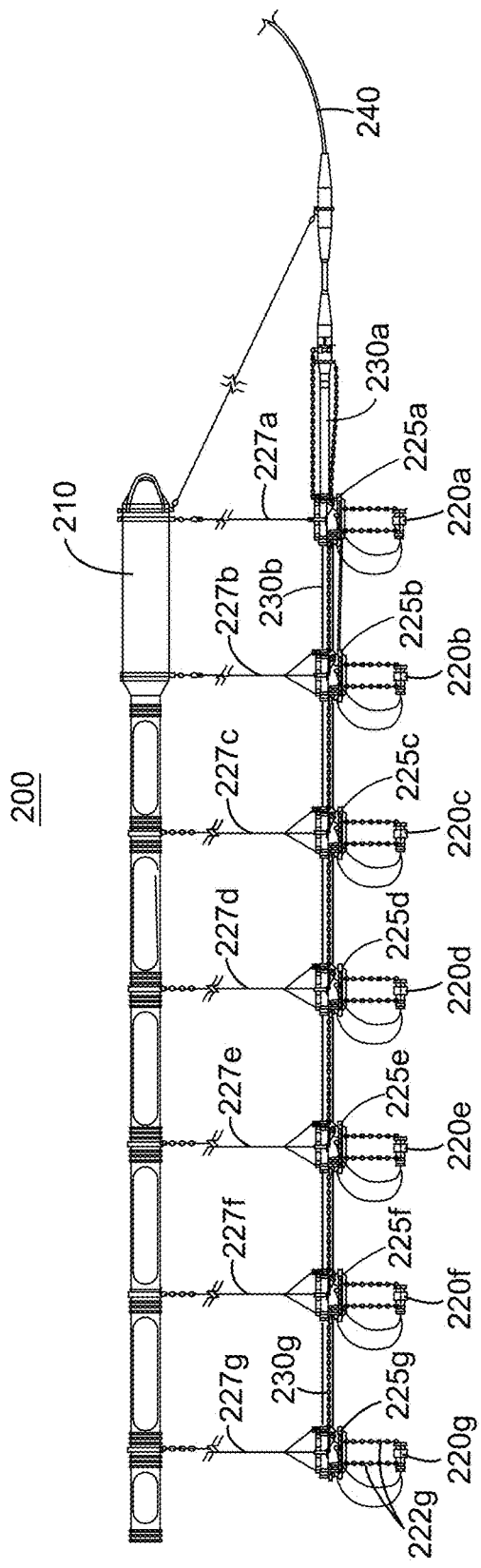
FIG. 2 illustrates a sub-array of a source array.
Figure 8:
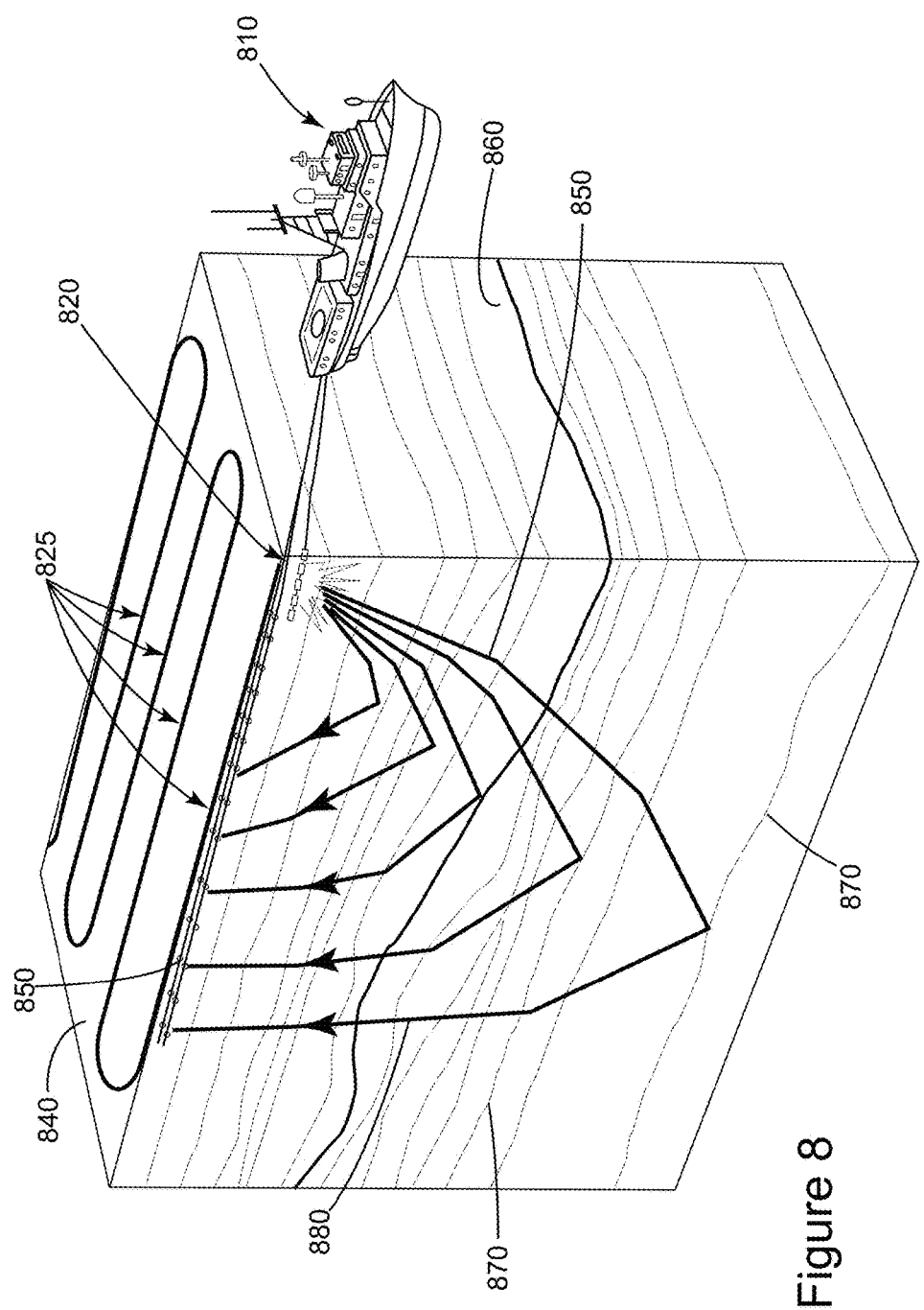
FIG. 8 is an illustration of a survey system, according to an embodiment.

The target 3D arrangement (simply called "geometry") is defined by relative positions of the individual seismic sources. Subsets of the individual seismic sources may be mounted and connected such that they move together. FIG. 2 illustrates a non-limiting example of such source array, but the various embodiments are not limited to this type of source being useable to any other existing seismic source having plural components that can be maneuvered independently to alter the 3D arrangement of the individual sources. For example, the individual seismic sources connected to a same float translate or rotate in a horizontal plane together, tracking the float's motion, while other individual seismic sources of the source array do not change their position or orientation. However, this arrangement is merely illustrative and it is not intended to be limiting. For example, as illustrated in FIGS. 4, 5, and 8 of U.S. Patent Application Publication No. 2013/0100764 (the entire content of which is incorporated herein by reference), the individual sources may be subject to various 3D arrangements.

Although depth of the individual seismic sources attached to the same float may be adjusted simultaneously, mechanisms enabling to adjust depth of one individual seismic source independently (i.e., without changing depth of any other individual seismic source) are available. For example, U.S. patent application Ser. No. 13/973,390 (whose entire content is incorporated herein by reference) discloses a seismic source having plural individual seismic sources attached to a float via cables associated with actuation devices, respectively. The actuation devices are configured to adjust cables' length to achieve a desired variable-depth profile.

Steering surfaces (e.g., birds, deflectors, wings, keels) may be used to change the geometry of the source array (i.e., adjusting position and orientation of towed components thereof such as a sub-array). A steering surface operates based on the idea that the flow of the water impinging on the steering surface generates a force proportional to the surface's projection in a plane perpendicular to the flow. By changing an angle of the steering surface with the flow direction, the area of the surface's projection in the plane perpendicular to the flow is changed, and, thus, the magnitude of the force due to this steering surface also changes. Thus, the position of a towed object connected to the steering surface can be modified by controlling the angle of the steering surface with the flow direction.

Figure 4A:
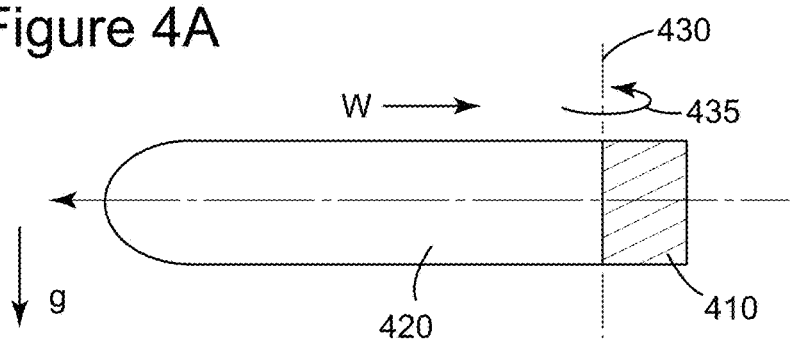
FIGS. 4A, 4B, 4C and 4D illustrate using steering surfaces for changing position of a sub-array.

For example, as illustrated in FIG. 4A, a steering surface 410 (a rudder or a flap) may be attached to a float 420. Steering surface 410's rotation around axis 430 to change the angle with the flow direction W is suggested by arrow 435. If surface 410 is not aligned along the flow direction W, the resulting force steers the float laterally, and thus, changing the source array's geometry.

Figure 4B:
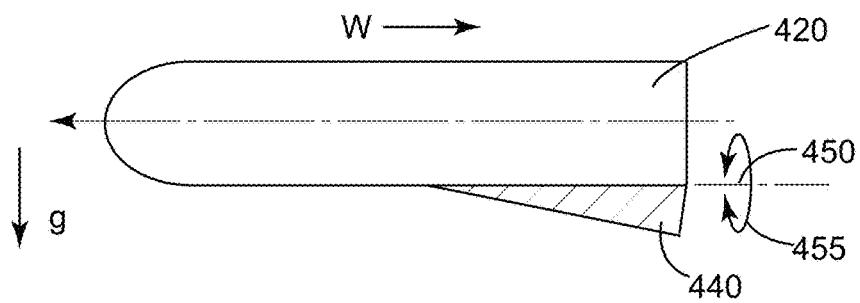

In another example illustrated in FIG. 4B, a steering surface 440 (i.e., a keel) may be attached underneath float 420. Steering surface 440's rotation around an axis 450 is suggested by arrow 455. If surface 440 is not aligned along the flow direction W, the resulting force steers the float laterally. The lateral steering combined with the towing force may adjust distance between sub-arrays and/or orientation of a sub-array in the horizontal plane, and ultimately the source array's geometry.

Figure 4C:
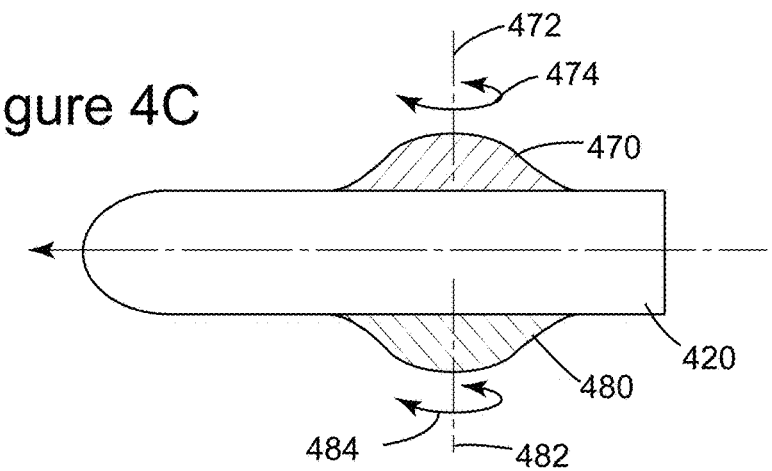

In yet another example illustrated in FIG. 4C, active wings 470 and 480 are attached laterally to float 420. Note that while FIGS. 4A and 4B represent vertical planes (as suggested by the arrow indicating gravity g's direction), FIG. 4C is a top view of float 420 (i.e., a horizontal plane). On a side note also as suggested by using the same label 420, the same float may be provided with one of these steering mechanisms or combination thereof. Wings 470 and 480 can be rotated around axes 472 and 482 as suggested by arrows 474 and 484. If wings 470 and 480 are inclined relative to the horizontal plane, the resulting forces push the float vertically up or down adjusting the float's depth, and, thus, changing the source array's geometry.

Figure 4D:
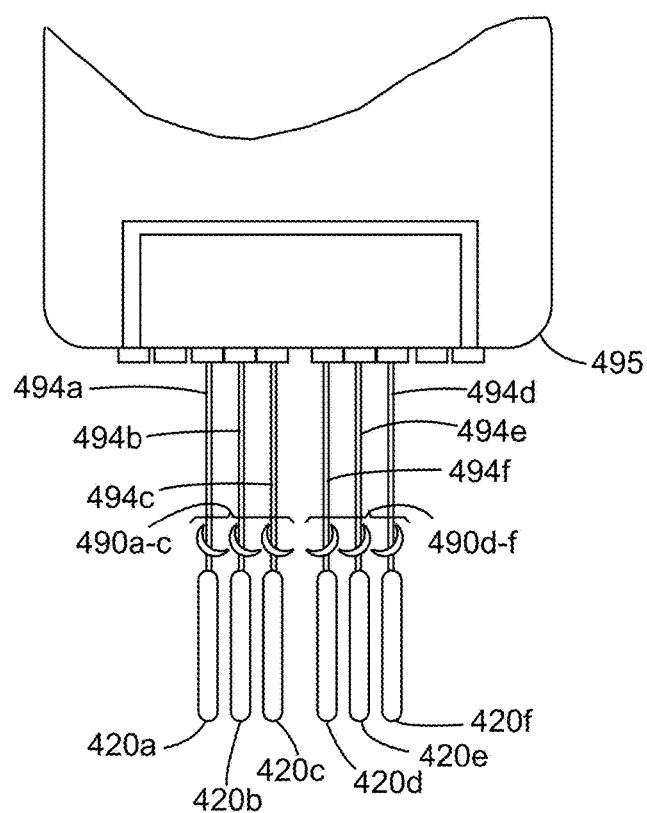

As illustrated in FIG. 4D, unlike in FIGS. 4A-4C where the steering surfaces are attached to the float, steering surfaces 490a-f are attached to towing cables 494a-e connecting floats 420a-f to a towing vessel 495.

Another way of adjusting a source array's geometry is by pulling one or more sub-arrays laterally via cables attached thereto. For example, distance between sub-arrays may be reduced if a rope tied there-between is shortened. This manner of steering a sub-array is illustrated in U.S. Patent Application Publication No. 2013/0070557, whose entire content is incorporated herein by reference.

Figure 5A:
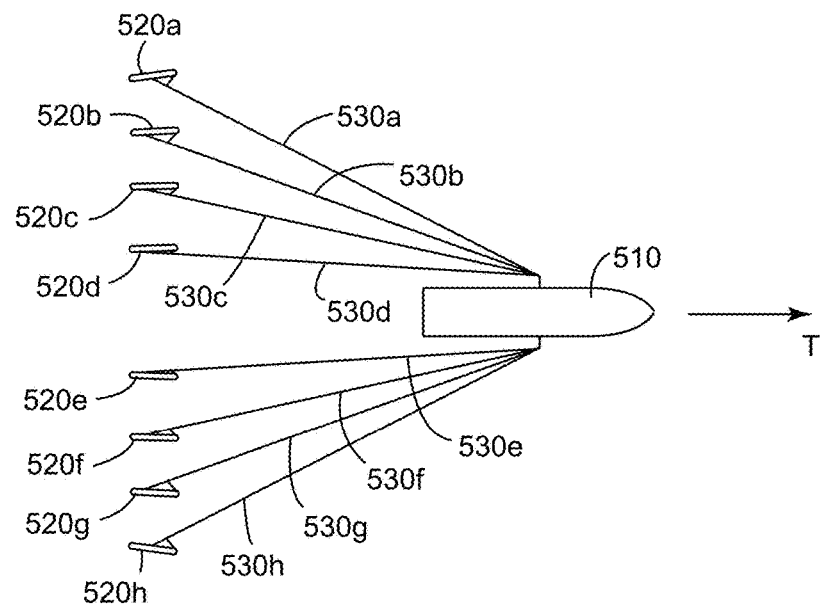
FIGS. 5A and 5B illustrate another mechanism for changing position of a sub-array.
Figure 5B:
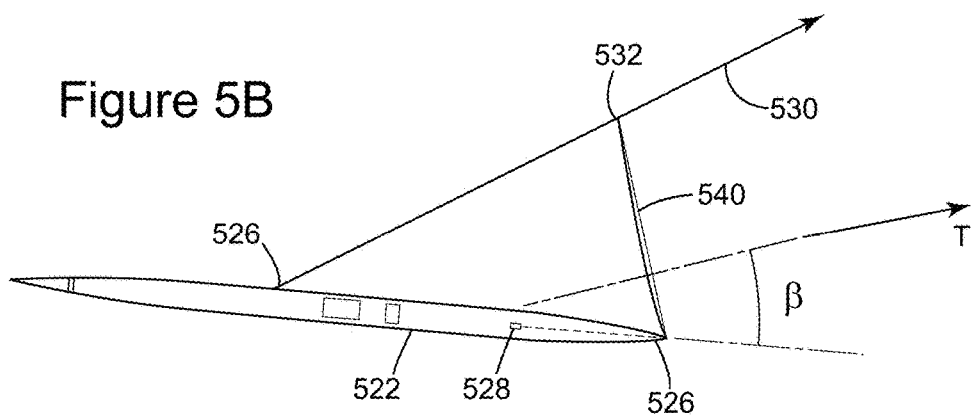

Yet another way of adjusting a source array's geometry is disclosed in U.S. Pat. No. 4,724,788. As illustrated in FIG. 5A, a vessel 510 tows sub-arrays 520a-h via tow cables 530a-h. As shown in FIG. 5B, a tow cable 530 is attached at a middle 524 of a sub-array's float 522. Another cable 540 is attached between a front end 526 of the float and a fixed position 532 on the tow cable 530. An angle β of float 522 with a towing direction T may be adjusted by varying the length of cable 540. The length of cable 540 is adjusted by rolling in or out a portion thereof from a winch 528 mounted on float 522.

Figure 6:
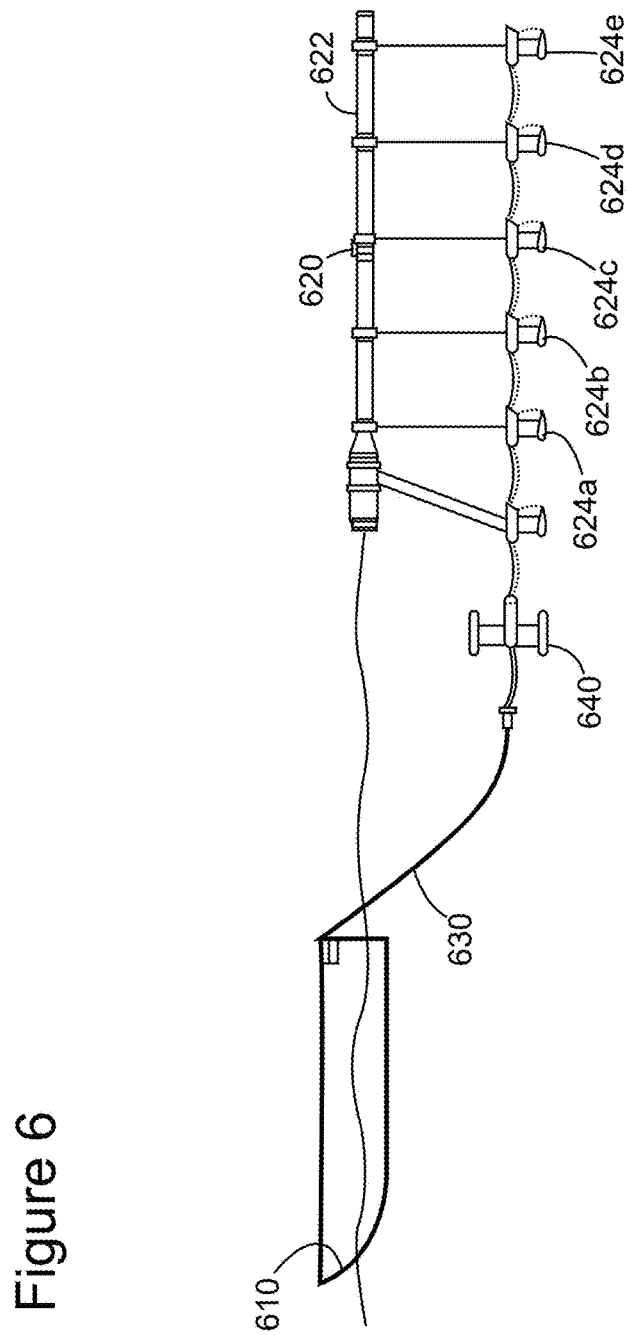
FIG. 6 illustrates a deflector device attached to a sub-array to change position thereof.

Yet another way of adjusting a sub-array's position is disclosed in U.S. Pat. No. 7,957,220. As illustrated in FIG. 6, a deflector device 640 is attached to tow cable 630 connecting sub-array 620 (including float 622 and individual sources 624a-e) to the vessel 610. Such deflector devices may be attached to tow cables of only some (one or two) among the sub-arrays of a source array, while the sub-arrays that do not have a deflector device attached to their respective tow cable may be connected to the sub-array (e.g., 620) that has a deflector device (e.g., 640) attached. Thus, for example, sub-arrays connected to sub-array 620 move together with sub-array 620 when deflector device 640 is controlled to change the horizontal position of sub-array 620.

Controlling (i.e., monitoring and adjusting) the source array's geometry allows achieving or reproducing a desired source signature. For example, in the context of 4D seismic data acquisition, the desired source signatures are the source signatures during a previously-conducted seismic survey (base or another monitor survey), which are reproduced to minimize data acquisition variations in different surveys. If the source array's geometry during a previously conducted survey is not known, source signature or seismic data for the current survey and the previously-conducted seismic survey may be compared while adjusting the target's geometry in order to reproduce the desired signature. In another example, the desired source signature is a seismic signature conducive to good seismic data quality and consistency. In one embodiment, the source array's geometry is continuously adjusted to reproduce past source signatures for plural shots.

Figure 7:
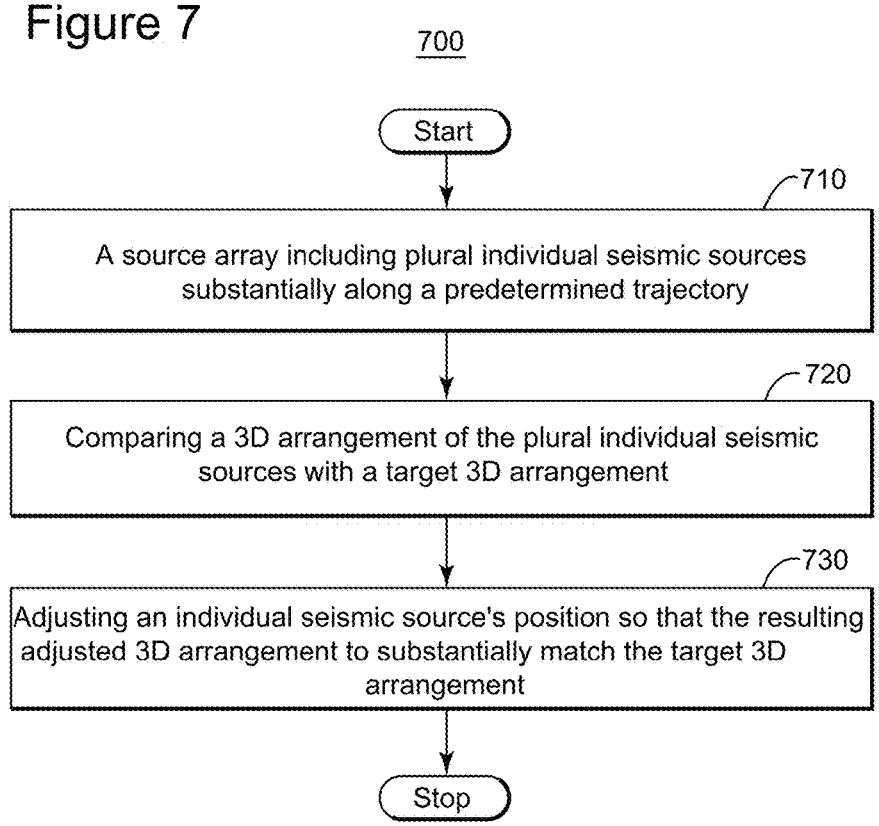
FIG. 7 is a flowchart of a method for performing a seismic survey according to an embodiment.

FIG. 7 is a flowchart of a seismic survey method 700 according to an exemplary embodiment. Method 700 includes towing a source array including plural individual seismic sources substantially along a predetermined path at 710. The term "substantially" here means "as close as practically achievable," given that path in the water may be affected by local and temporal factors like currents, waves, etc. Method 700 further includes comparing a current 3D arrangement of the plural individual seismic sources (i.e., source array's geometry) with a target 3D arrangement at 720. Method 700 then includes adjusting a position of at least one individual seismic source so that the resulting adjusted 3D arrangement to substantially match the target 3D arrangement at 730. It is known in the art, that an absolute perfect match is practically impossible to achieve and maintain when a source array is towed in water, because local and momentary small deviations are unavoidable due, for example, to currents, waves, etc. Thus, in this context, "substantially matching" means again "as close as practically achievable." When the source array having the adjusted 3D arrangement is fired, it generates a desired source signature.

When performing a seismic survey, towing vessels follow a predetermined trajectory. For example, as illustrated in FIG. 8, a vessel 810 tows a source array 820 back and forth along sail-lines 825. Vessel 810 also tows streamers 830 housing seismic receivers. However, the seismic receivers may also be placed on the seafloor. Streamers 830 may be towed horizontally (i.e., at a constant depth relative to a surface 840) of the water. However, the streamers may be slanted or may have a curved variable-depth profile as described, for example, in U.S. Patent Application 2011/0176384, the entire content of which is incorporated herein by reference. Source array 820 is configured to generate a seismic wave 850 that propagates downward and penetrates the seafloor 860 until eventually a reflecting structure 870 reflects the seismic wave. Reflected seismic waves 880 that propagate upward are detected by the seismic receivers carried by the streamers.

As illustrated in FIG. 8, the towing trajectory is made of substantially straight sail-lines 825. Source array 820 is typically fired at plural shot locations along sail-lines 825. When the seismic survey is part of a 4D seismic data acquisition, the previous sail-lines and shot locations are preferably followed to repeat a previous (base) survey. In other words, during a monitor (later) survey, source array 820's geometry is controlled to reproduce the source signature shots fired during the base (first in time or a previous reference) survey.

Figure 3A:
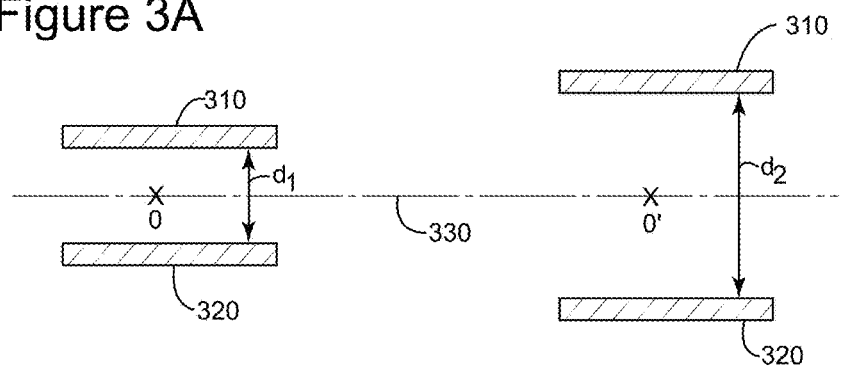
FIGS. 3A, 3B and 3C illustrate changes of a source array's geometry that alter a source signature.
Figure 3B:
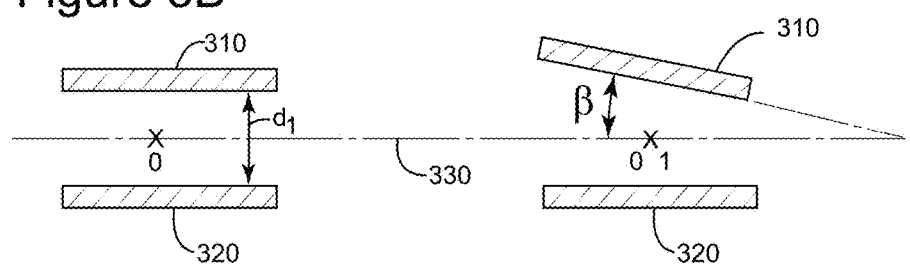
Figure 3C:
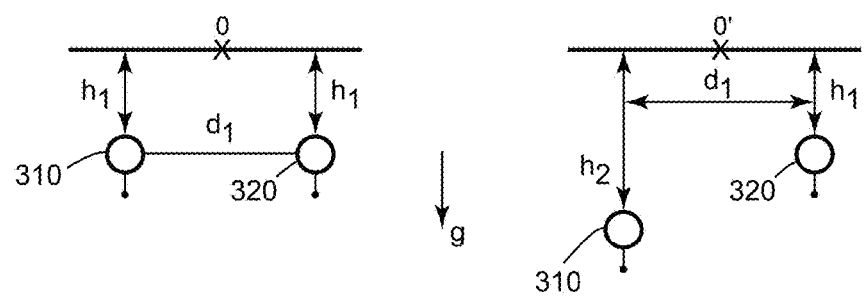

A 3D arrangement of the individual sources (i.e., source's geometry) may be characterized by parameters that can be monitored and adjusted to reproduce the source signatures. If the source array has plural seismic sub-arrays, a parameter related to the seismic-source's geometry is a distance between two seismic sub-arrays in a horizontal plane, perpendicular to a towing direction (see, for example, $d_1$ in FIG. 3A). Another parameter may be the orientation relative to the sail-line of a sub-array (see, for example, β FIG. 3B). Another parameter may be a sub-array depth (see, for example, $h_1$ in FIG. 3C) or even an individual seismic source's depth. Yet another parameter may be an inline offset of the sub-arrays. Note that the location of the source array along the sail-line may not be affected by variations of the parameters related to the source array's geometry. In other words, these parameters are not global parameters characterizing the source array as a whole, but they are related to the source array's components (i.e., individual seismic sources or sub-arrays) and their 3D arrangement. However, the source signature may also be influenced by a global parameter such as the orientation of the source as a whole relative to the towing direction. This global orientation is also a source-related parameter that may be monitored and adjusted in order to achieve or reproduce a desired target signature.

In 4D seismic data acquisition, reproducing the 3D arrangement of the individual sources during the previous (e.g., base) survey makes the source signature match the source signature obtained in the previous survey, and, therefore, the undesirable data acquisition differences between different surveys are minimized. However, a past 3D arrangement likely varied during the previously-conducted seismic survey as changes may occur as frequent as from one shot location to the next. The current 3D arrangement may be controlled to track these changes of the past 3D arrangement. In this context, it should be mentioned that in order to minimize data acquisition differences between different surveys, the relative position of the source and receivers should also be reproduced. This aspect may also be formulated in terms of controlling geometry to reproduce the source signature because the source signature depends on the azimuth angle (i.e., the angle between towing line and a line connecting a shot location to receiver location when detecting the seismic wave generated at the shot location).

Figure 9:
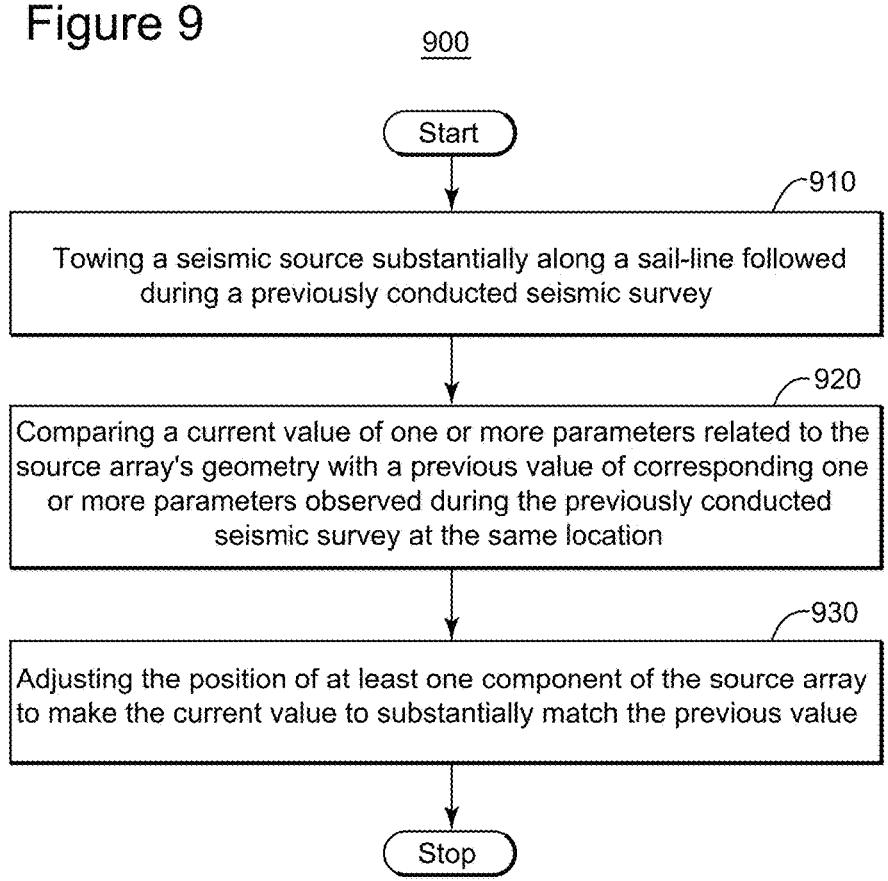
FIG. 9 is a flowchart of a method for reproducing source signatures of shots fired during a previously-conducted seismic survey according to an embodiment.

Thus, FIG. 9 is a flowchart of a method 900 for reproducing geometry of a source array used during a previously-conducted seismic survey. Method 900 includes towing the source array substantially along a sail-line followed during the previously-conducted seismic survey at 910. Method 900 further includes comparing a current value of one or more parameters related to the source array's geometry with a corresponding previous value of the one or more parameters observed during the previously-conducted seismic survey at 920. The compared current value(s) and previous value(s) correspond to the same location along the sail-line. The previous value(s) of one or more parameters may be retrieved from a database.

Method 900 further includes adjusting the position of at least one component of the source array to make the current value match the corresponding previous value at 930. The at least one component may be a sub-array, a float or an individual seismic source.

In one embodiment, the at least one component is a sub-array, a steering surface or a deflector. The parameter may then be the distance between two seismic sub-arrays of the source array, a depth of a sub-array and/or an angle of a sub-array with the sail-line. In one embodiment, the at least one component is an individual seismic source and the parameter is the individual seismic source's depth.

A location for which the parameter(s) comparison is performed may be at a beginning of the sail-line. A current parameter may be compared with a statistical value like a mean or a median value of the parameter along the sail-line during the previous (base) survey. For example, at a beginning of a sail-line, the separation between two sub-arrays may be compared with the mean separation between the two sub-arrays along the sail-line as observed during the previous (base) survey.

The parameter(s) comparison may be performed at plural locations along a sail-line. In one embodiment, the parameter(s) comparison may be performed and adjustments made at predetermined locations based on one or more rules. For example, the locations may include one between each pair of adjacent shot locations along the sail-line. In another example, the locations may be at predetermined intervals from one another along the sail-line. In one embodiment, the frequency of performing parameter(s) comparison may be determined by the density of parameter values acquired during the previously-conducted survey. In another embodiment, the frequency of performing parameter(s) comparison may be determined by the time needed to perform an adjustment. In another embodiment, the parameter(s) comparison may be performed at predetermined time intervals while the source array is towed along the sail-line. The frequency of performing parameter(s) comparison may also be correlated with the towing speed.

A positive action to adjust a component's position may occur only if a difference between compared values of a parameter is larger than a predetermined threshold. If plural parameters are compared, each parameter may have an associated individual threshold.

The previous value(s) of one or more parameters related to geometry of the source array observed during the previously-conducted seismic survey may be retrieved from a data storage medium. These previous values may be organized as a database. The current values of one or more parameters may be recorded. These current values may be stored in the same (or another) database as the previous values. The current and previous values are associated with locations along the survey trajectory.

The adjusting step may include plural sequential adjustment of the source array's components. For example, FIG. 10 illustrates a 3D arrangement (geometry) of a source array 1000 including three sub-arrays 1010, 1020 and 1030. Initially (upper band), this 3D arrangement is characterized by two distances $d_1$ and $d_2$ between adjacent sub-arrays. When the distances need adjustment (according to the parameters comparison), distance $d_1$ is adjusted first to $d_1'$ by actively modifying the trajectory of seismic sub-array 1010 or 1020. When seismic sub-array 1020 drifts away from seismic sub-array 1010 while sub-array 1030 maintains its position perpendicular to a towing direction, distance between sub-arrays 1020 and 1030 becomes smaller, i.e., $d1+d2-d_1'$. This distance is then adjusted (increased) to $d_2'$ by actively modifying the trajectory of seismic sub-array 1030 without modifying the trajectory of seismic sub-array 1010 and 1020, so that distance $d_1'$ can be maintained.

Figure 11:
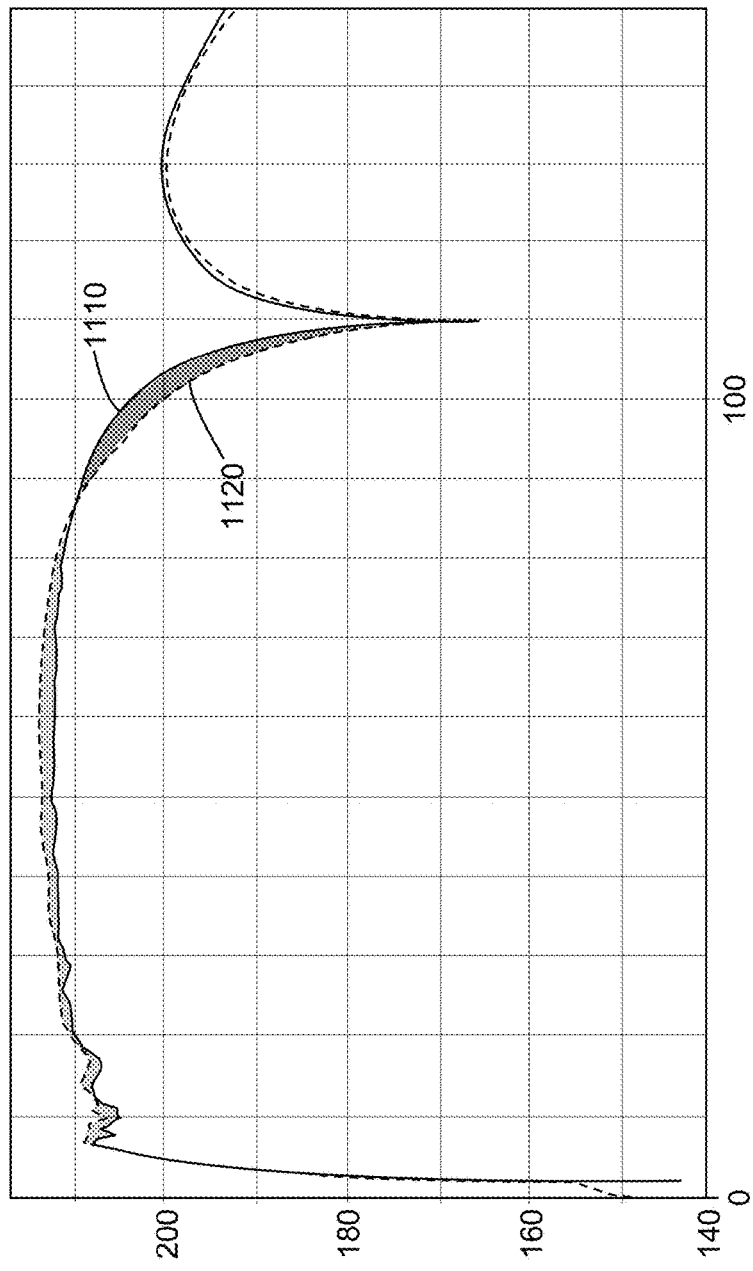
FIG. 11 is a graph of relative amplitude versus frequency illustrating the impact of distance between sub-arrays on source signature.
Figure 12A:
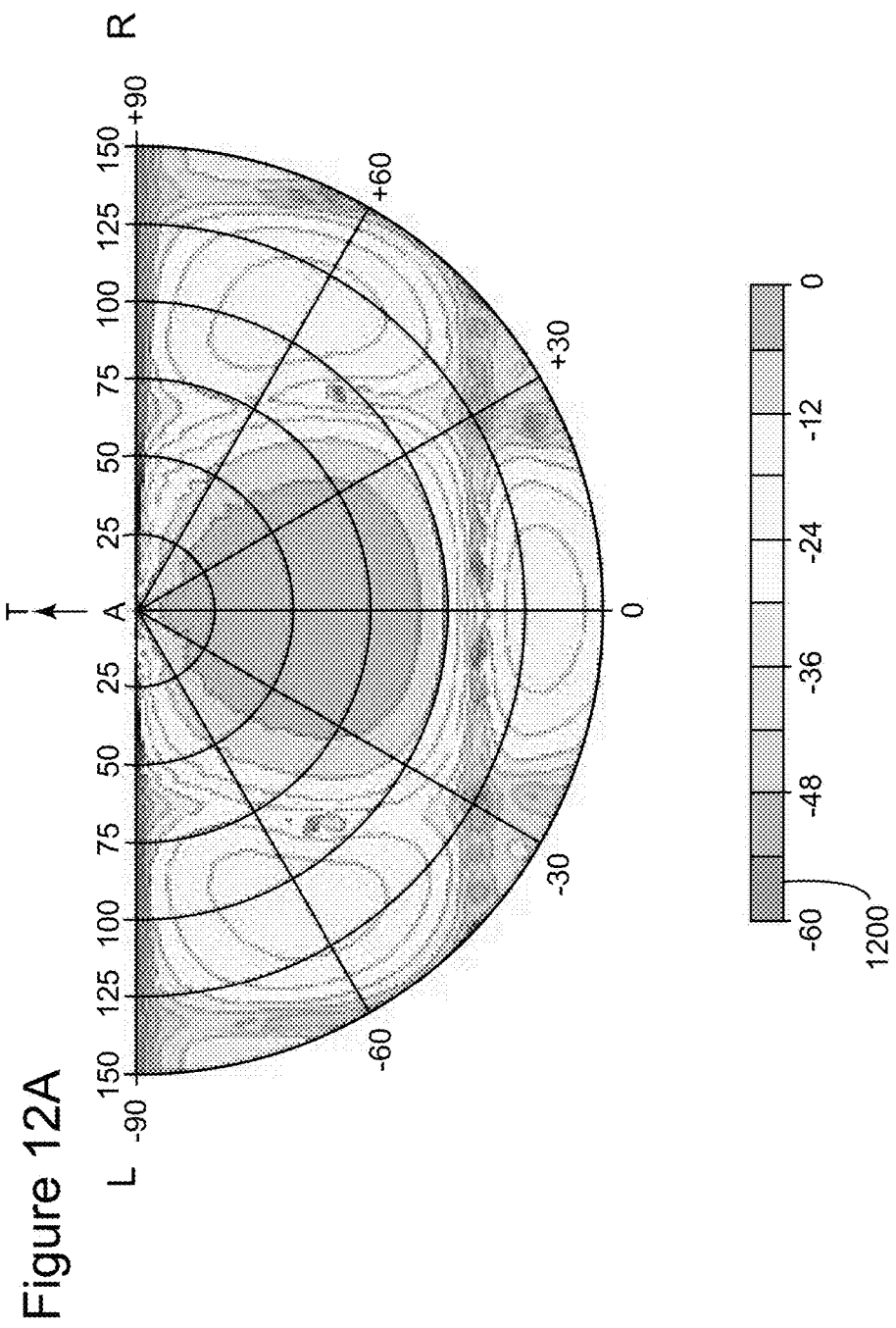
FIGS. 12A and 12B are graphs illustrating the impact of distance between sub-arrays on source signature's directivity.
Figure 12B:
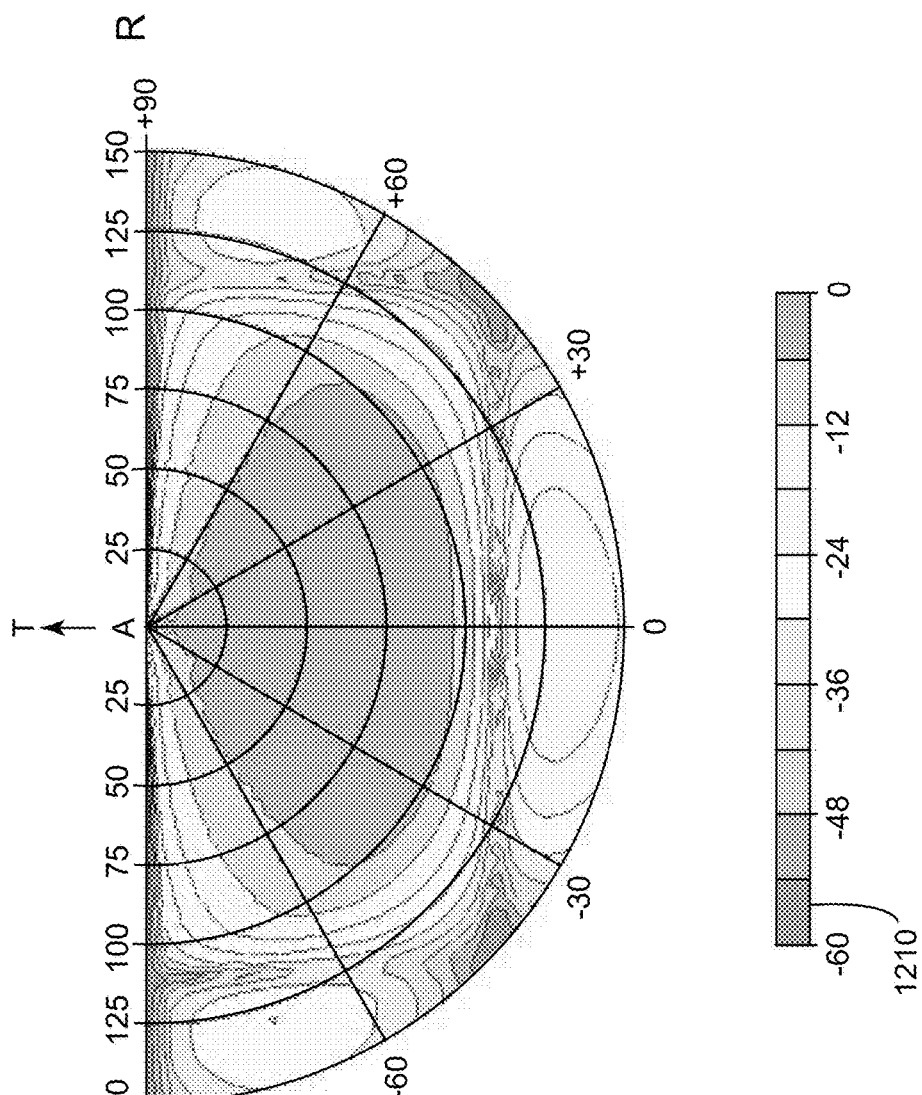

By controlling the distances between sub-arrays, changes of the source signature illustrated in graphs in FIGS. 11, 12A and 12B are reduced if not eliminated. FIG. 11 is a graph (x-axis representing frequency in Hz and y-axis representing normalized amplitude in dB) illustrating source signatures for two sub-arrays at different distances there-between. Line 1110 (continuous line) is the source signature of the source array for an 8 m horizontal distance between the sub-arrays, and line 1120 (dashed line) is the source signature of the source array for a 5 m distance between the sub-arrays. The band between lines 1110 and 1120 emphasizes the change due to the change in distance (i.e., geometry) between the two sub-arrays.

The change in the source signature is even more visible when considering various azimuth angles. The azimuth angle is the angle from the sail-line S to a line between the shot location and a receiver location. FIG. 12A is a two-dimensional graphic representation of the source signature's directivity (i.e., dependence of azimuth angle) when distance between the sub-arrays is 8 m. Point A is a shot position while the towing vessel moves in direction T; L and R indicate left and right of (a vertical plane including) the towing direction T. The various half-circles around point A are reference lines for frequencies of 25, 50, . . . 150 Hz. The various shades of gray correspond to different amplitudes (band 1200 illustrates the correlation between the shades of gray and normalized amplitudes in dB). The azimuth angle varies between −90° and 90° around the circumference of this graph.

FIG. 12B is a two-dimensional graphic representation (in a similar format as FIG. 12A) of the source signature's directivity when distance between the sub-arrays is 5 m. By comparing FIGS. 12A and 12B, one notes that the larger the azimuth angle, the more different are the source signatures for the two distances between the sub-arrays.

FIG. 13 is a flowchart of a method 1300 for evaluating changes of an underground structure explored using seismic surveys. Method 1300 includes towing a source array including seismic sub-arrays substantially along sail-lines of a previously-conducted seismic survey at 1310. Method 1300 further includes steering one of the seismic sub-arrays to make a current value of a distance between one of the sub-arrays and another one of the seismic sub-arrays substantially match a corresponding value of the distance observed during the previously-conducted seismic survey at 1320.

Method 1300 further includes firing the source array at shot locations at which shots occurred during the previously-conducted seismic survey at 1330 and acquiring seismic data at 1340. Finally, at 1350, method 1300 includes comparing the monitor seismic data with seismic data acquired during the previously-conducted seismic survey to evaluate the changes of the underground structure. Steps 1330-1350 may also be added to any embodiment of the previously described method 900.

The method may further include monitoring the distance between the two sub-arrays, comparing the current value with the corresponding value for plural locations, and steering one of the seismic sub-arrays only if the comparison indicates a difference between the current distance and the corresponding distance during the previously-conducted survey exceeding a predetermined threshold. The method may also include retrieving (e.g., from a database) plural values of the distance observed at plural locations along a sail-line during the previously-conducted seismic survey, and steering one of the seismic sub-arrays so the current value matches the evolution of the distance inferred based on the plural values. In other words, instead of basing the steering on momentary comparison, the evolution of the distance during the monitor survey is controlled preemptively to match inferred evolution.

Figure 14:
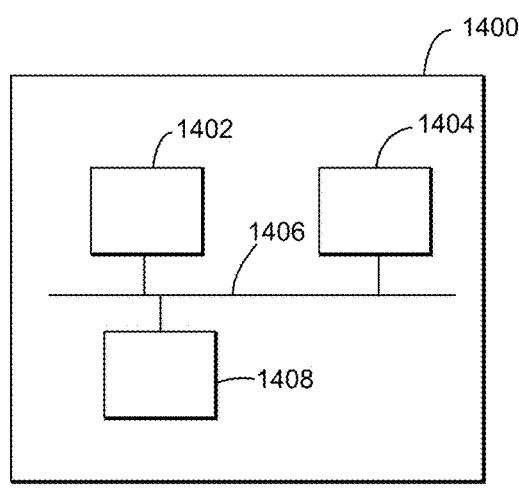
FIG. 14 is a schematic diagram of a controller according to an embodiment.

The above-discussed methods may be performed by a controller which may be located on the towing vessel, on the source-array or both of them. The structure of such a controller 1400 is illustrated in FIG. 14. Such a controller 1400 includes a processor 1402 and a storage device 1404 that communicate together via a bus 1406. An input/output interface 1408 also communicates with the bus 1406 and allows an operator to communicate with the processor or the memory, for example, to input software instructions. The input/output interface 1408 may also be used by the controller to communicate with other controllers or interfaces that are provided on the vessel. For example, the input/output interface 1408 may communicate with a parameter measurement system (not shown) for acquiring current parameter values. Controller 1400 may be a computer, a server, a processor or dedicated circuitry.

The disclosed embodiments provide methods for controlling a source array to achieve an intended source signature. These methods may be applied in various contexts such as 3D data acquisition, 4D data acquisition, wide azimuth data acquisition, etc. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A method for evaluating changes of an underground structure explored using seismic surveys, the method comprising:
    towing a source array including seismic sub-arrays, substantially along sail-lines of a previously-conducted seismic survey;
    steering one of the seismic sub-arrays to make a current value of a parameter characterizing a geometry of the one of the sub-arrays and another one of the seismic sub-arrays to substantially match a corresponding value of the parameter observed during the previously-conducted seismic survey;
    activating the source array at shot locations where the source array was fired during the previously-conducted seismic survey;
    acquiring monitor seismic data; and
    comparing the monitor seismic data with seismic data acquired during the previously-conducted seismic survey to evaluate the changes of the underground structure,
    wherein a change of the parameter affects a signature of the source array, and
    wherein the parameter is one of (1) a distance between the one of the sub-arrays and another one of the seismic sub-arrays, wherein the distance is perpendicular on a sail-line, (2) a depth of the one of the sub-arrays, and (3) an angle of the one of the sub-arrays and the sail-line.

2. The method of claim 1, wherein the monitor seismic data and the seismic data acquired during the previously-conducted seismic survey are wide-azimuth seismic data.

3. The method of claim 1, wherein a time interval between the previously-conducted seismic survey and acquiring monitor seismic data is substantially longer than duration of the previously-conducted seismic survey of a target area.

4. The method of claim 1, further comprising:
    monitoring the parameter of the one of the sub-arrays and the other one of the seismic sub-arrays over plural locations;
    comparing the current value with the corresponding value for the plural locations; and
    steering the one of the seismic sub-arrays only if the comparing indicates a difference between the current value and the corresponding value exceeding a predetermined threshold.

5. The method of claim 1, further comprising:
    retrieving plural values of the parameter observed at plural locations along a sail-line during the previously-conducted seismic survey; and
    steering the one of the seismic sub-arrays such that the current value to match an evolution of the parameter inferred based on the plural values.

6. A controller for evaluating changes of an underground structure explored using seismic surveys, the controller comprising:
    a processor for executing instructions; and
    a storage device for storing the instructions, wherein the instructions include,
    towing a source array including seismic sub-arrays, substantially along sail-lines of a previously-conducted seismic survey,
    steering one of the seismic sub-arrays to make a current value of a parameter characterizing a geometry of the one of the sub-arrays and another one of the seismic sub-arrays to substantially match a corresponding value of the parameter observed during the previously-conducted seismic survey,
    activating the source array at shot locations where the source array was fired during the previously-conducted seismic survey,
    acquiring monitor seismic data, and
    comparing the monitor seismic data with seismic data acquired during the previously-conducted seismic survey to evaluate the changes of the underground structure,
    wherein a change of the parameter affects a signature of the source array, and
    wherein the parameter is one of (1) a distance between the one of the sub-arrays and another one of the seismic sub-arrays, wherein the distance is perpendicular on a sail-line, (2) a depth of the one of the sub-arrays, and (3) an angle of the one of the sub-arrays and the sail-line.

7. The controller of claim 6, wherein the monitor seismic data and the seismic data acquired during the previously-conducted seismic survey are wide-azimuth seismic data.

8. The controller of claim 6, wherein a time interval between the previously-conducted seismic survey and acquiring monitor seismic data is substantially longer than duration of the previously-conducted seismic survey of a target area.

9. The controller of claim 6, the instructions further comprising:
    monitoring the parameter of the one of the sub-arrays and the other one of the seismic sub-arrays over plural locations;
    comparing the current value with the corresponding value for the plural locations; and
    steering the one of the seismic sub-arrays only if the comparing indicates a difference between the current value and the corresponding value exceeding a predetermined threshold.

10. The controller of claim 6, further comprising:
    retrieving plural values of the parameter observed at plural locations along a sail-line during the previously-conducted seismic survey; and
    steering the one of the seismic sub-arrays such that the current value to match an evolution of the parameter inferred based on the plural values.

* * * * *